(12) United States Patent
Xu et al.

(10) Patent No.: US 12,614,810 B2
(45) Date of Patent: Apr. 28, 2026

(54) BATTERY AND BATTERY APPARATUS

(71) Applicant: CALB Co., Ltd., Jiangsu (CN)

(72) Inventors: Jiuling Xu, Changzhou (CN); Jiyu Bi, Changzhou (CN); Lulu Zhang, Changzhou (CN); Yuyang Shen, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 394 days.

(21) Appl. No.: 17/834,901

(22) Filed: Jun. 7, 2022

(65) Prior Publication Data

US 2023/0327272 A1 Oct. 12, 2023

(30) Foreign Application Priority Data

Apr. 7, 2022 (CN) .......................... 202210358749.8

(51) Int. Cl.
*H01M 50/325* (2021.01)
*H01M 50/143* (2021.01)
*H01M 50/15* (2021.01)
*H01M 50/55* (2021.01)
*H01M 50/627* (2021.01)

(52) U.S. Cl.
CPC ....... *H01M 50/325* (2021.01); *H01M 50/143* (2021.01); *H01M 50/15* (2021.01); *H01M 50/55* (2021.01); *H01M 50/627* (2021.01)

(58) Field of Classification Search
None
See application file for complete search history.

(56) References Cited

U.S. PATENT DOCUMENTS

| | | | |
|---|---|---|---|
| 8,642,196 B2 * | 2/2014 | Guen | H01M 50/578 429/59 |
| 2020/0203699 A1 | 6/2020 | Li et al. | |
| 2022/0373602 A1 | 11/2022 | Kitagawa et al. | |

FOREIGN PATENT DOCUMENTS

| | | | | |
|---|---|---|---|---|
| CN | 104282850 A | * | 1/2015 | H01M 2/02 |
| CN | 206564278 | | 10/2017 | |
| CN | 206564278 U | * | 10/2017 | |

(Continued)

OTHER PUBLICATIONS

Wang Zongyuan, et al., EPO Machine Translation of CN 107316956 A "Explosion proof assembly and secondary battery top cover", Nov. 3, 2017, p. 1-7 (Year: 2017).*

(Continued)

*Primary Examiner* — Nicole M. Buie-Hatcher
*Assistant Examiner* — Krishna R Hammond
(74) *Attorney, Agent, or Firm* — JCIP GLOBAL INC.

(57) ABSTRACT

A battery and a battery apparatus are provided. The battery pack includes a cover plate, an explosion-proof valve, and a protective patch. The explosion-proof valve is arranged on the cover plate. The protective patch is arranged on an outer side of the cover plate. A sealed chamber is formed between the explosion-proof valve and the protective patch, and a notch penetrating through the protective patch is arranged on the protective patch in a thickness direction, such that when a predetermined pressure is applied, the sealed chamber communicates with an outside through the notch. The notch has a total length of a and the protective patch has a thickness of b, where $5 \le a/b \le 100$ and $0.01 \text{ mm} \le b \le 1.2 \text{ mm}$, and the protective patch has a tensile strength of c, where $c/b = xb^{-1.073}$.

12 Claims, 11 Drawing Sheets

(56)  References Cited

FOREIGN PATENT DOCUMENTS

| CN | 107316956 | A | * | 11/2017 | ........ H01M 50/3425 |
| CN | 112072045 | | | 12/2020 | |
| CN | 112303308 | A | * | 2/2021 | .............. B60K 1/04 |
| CN | 112610738 | A | * | 4/2021 | .............. F16J 15/06 |
| CN | 112787007 | A | * | 5/2021 | ........ H01M 10/4228 |
| CN | 111799402 | B | * | 6/2021 | .......... H01M 10/425 |
| CN | 113161670 | A | * | 7/2021 | .......... H01M 10/425 |
| WO | WO-2021149774 | A1 | * | 7/2021 | ......... G01R 31/3648 |

OTHER PUBLICATIONS

"Search Report of Europe Counterpart Application", issued on Sep. 15, 2023, p. 1-p. 6.

"Office Action of U.S. Related Application, U.S. Appl. No. 17/834,949", issued on Mar. 7, 2025, p. 1-p. 32.

"Office Action of Europe Related Application, Application No. 22178853.2", issued on Oct. 9, 2025, p. 1-p. 5.

* cited by examiner

BATTERY AND BATTERY APPARATUS

CROSS-REFERENCE TO RELATED APPLICATION

This application claims the priority benefit of China application serial no. 202210358749.8, filed on Apr. 7, 2022. The entirety of the above-mentioned patent application is hereby incorporated by reference herein and made a part of this specification.

BACKGROUND

Technical Field

The disclosure relates to the technical field of batteries, and in particular, relates to a battery and a battery apparatus.

Description of Related Art

In the related art, the explosion-proof valve is generally fixed on the edge of the explosion-proof hole by a sheet-shaped explosion-proof membrane. When the internal pressure of the battery is excessively large, the explosion-proof membrane is separated from the explosion-proof hole to achieve explosion-proof effect.

However, since the explosion-proof membrane is exposed, damage problems may occur after prolonged use.

SUMMARY

The disclosure provides a battery and a battery apparatus.

According to the first aspect of the disclosure, a battery is provided, and the battery includes a cover plate, an explosion-proof valve, and a protective patch. An explosion-proof hole is arranged on the cover plate. The explosion-proof valve is arranged on the cover plate to shield the explosion-proof hole. The protective patch is located on an outer side of the cover plate and shields the explosion-proof hole. A sealed chamber is formed between the explosion-proof valve and the protective patch, and a notch penetrating through the protective patch is arranged on the protective patch in a thickness direction, such that when a predetermined pressure is applied, the sealed chamber communicates with an outside through the notch. The notch has a total length of a and the protective patch has a thickness of b, where $5 \leq a/b \leq 100$ and 0.01 mm $\leq b \leq 1.2$ mm, the protective patch has a tensile strength of c, where $c/b = xb^{-1.073}$ and 160 (Mpa/mm$^2$) $\leq x \leq 175$ (Mpa/mm$^2$), and a tensile strength test method applied to the protective patch is: GB/T 13542.2–2009.

According to the second aspect of the disclosure, the disclosure further provides a battery apparatus including the abovementioned battery.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

Figure 1:
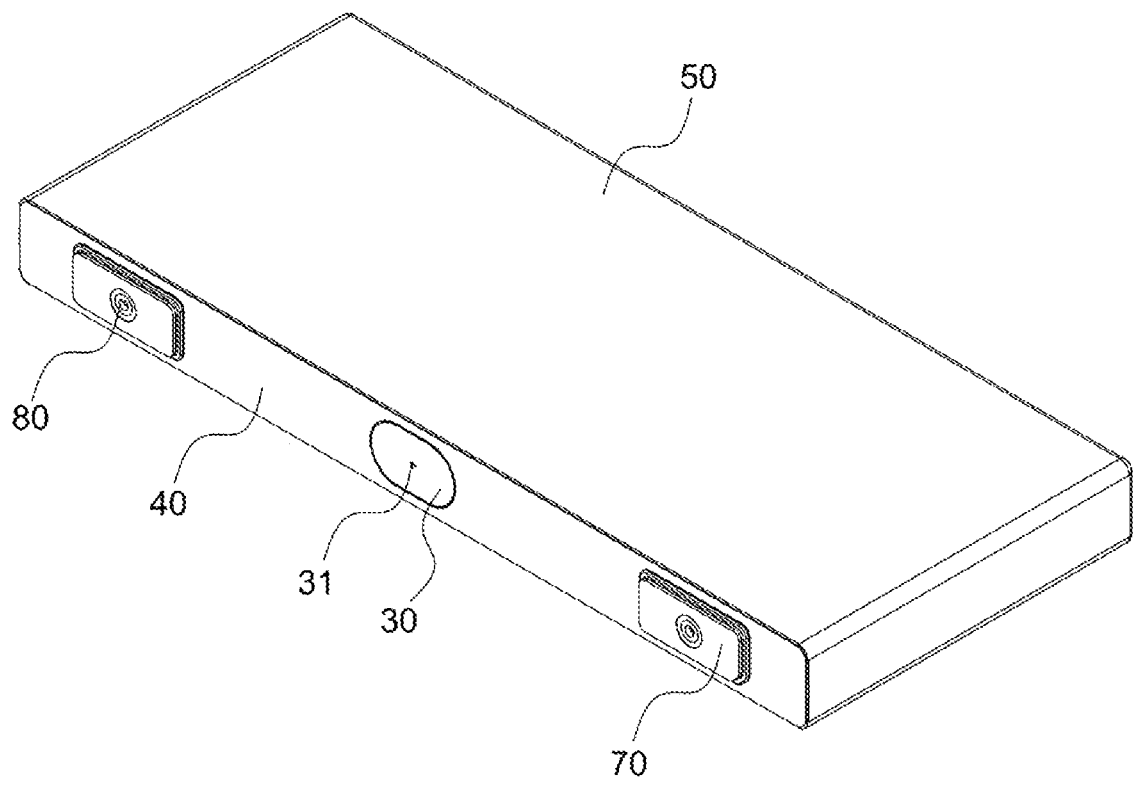
FIG. 1 is a schematic view of a structure of a battery according to an exemplary embodiment.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

An embodiment of the disclosure provides a battery. With reference to FIG. 1 to FIG. 12, the battery includes a cover plate 10 provided with an explosion-proof hole 11, an explosion-proof valve 20 arranged on the cover plate 10 to shield the explosion-proof hole 11, and a protective patch 30 located on an outer side of the cover plate 10 and shielding the explosion-proof hole 11. A sealed chamber 111 is formed between the explosion-proof valve 20 and the protective patch 30, and a notch 31 penetrating through the protective patch 30 is arranged on the protective patch 30 in a thickness direction, such that when a predetermined pressure is applied, the sealed chamber 111 communicates with an outside through the notch 31. The notch 31 has a total length of a and the protective patch 30 has a thickness of b, where $5 \leq a/b \leq 100$ and $0.01$ mm$\leq b \leq 1.2$ mm, the protective patch 30 has a tensile strength of c, where $c/b = xb^{-1.073}$ and $160$ (Mpa/mm$^2$)$\leq x \leq 175$ (Mpa/mm$^2$), and a tensile strength test method applied to the protective patch 30 is: GB/T 13542.2–2009.

The battery provided by an embodiment of the disclosure includes the cover plate 10, the explosion-proof valve 20, and the protective patch 30. The explosion-proof hole 11 is arranged on the cover plate 10, the explosion-proof valve 20 is arranged on the cover plate 10 and shields the explosion-proof hole 11. By arranging the protective patch 30 on the outer side of the cover plate 10 and shielding the explosion-proof hole 11, the protective patch 30 can safeguard the explosion-proof valve 20 to protect the explosion-proof valve 20, and the life and safety of the explosion-proof valve 20 is thereby improved. The notch 31 is arranged on the protective patch 30. In this way, the notch 31 is in a closed state under normal conditions, that is, the chamber 111 is a sealed chamber. When the battery is tested for airtightness, the notch 31 can be in an open state when a predetermined pressure is applied, such that the chamber 111 is an unsealed chamber. Through the arrangement of the notch 31, the explosion-proof valve 20 is effectively protected under normal use. The notch 31 may further be used for the airtightness testing of the battery to accordingly improve the performance of the battery.

It is noted that the protective patch 30 is located on the outer side of the cover plate 10 and the protective patch 30 may be arranged on the cover plate 10, or the protective patch 30 may be arranged on the explosion-proof valve 20, so that the protective patch 30 is located on the outer side of the cover plate 10 to safeguard the explosion-proof valve 20. In some embodiments, a reinforcement ring may be arranged on the cover plate 10, and the protective patch 30 may be arranged on the reinforcement ring. Herein, a hole wall of the explosion-proof hole 11, the explosion-proof valve 20, and the protective patch 30 may together enclose the chamber 111. In some embodiments, a reinforcement ring may be arranged on the explosion-proof valve 20, and the protective patch 30 may be arranged on the reinforcement ring. Herein, the explosion-proof valve 20 and the protective patch 30 may together enclose the chamber 111.

Figure 4:
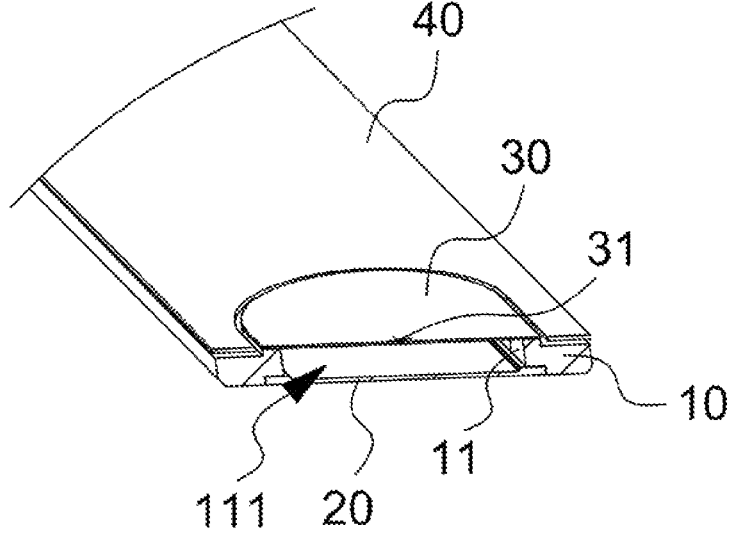
FIG. 4 is a schematic cross-sectional view of a portion of the battery according to an exemplary embodiment.

As shown in FIG. 4, the protective patch 30 is arranged on an outer surface of the cover plate 10 and shields the explosion-proof hole 11, and the hole wall of the explosion-proof hole 11, the explosion-proof valve 20, and the protective patch 30 together enclose the chamber 111. The protective patch 30 may thereby be arranged opposite to the explosion-proof valve 20, so that the protective patch 30 can reliably protect the explosion-proof valve 20. The protective patch 30 may prevent a foreign object from entering the explosion-proof valve 20 or prevent a sharp object from piercing the explosion-proof valve 20. At the same time, the protective patch 30 may also achieve dustproof and waterproof and thereby improving the safety performance of the explosion-proof valve 20.

Figure 12:
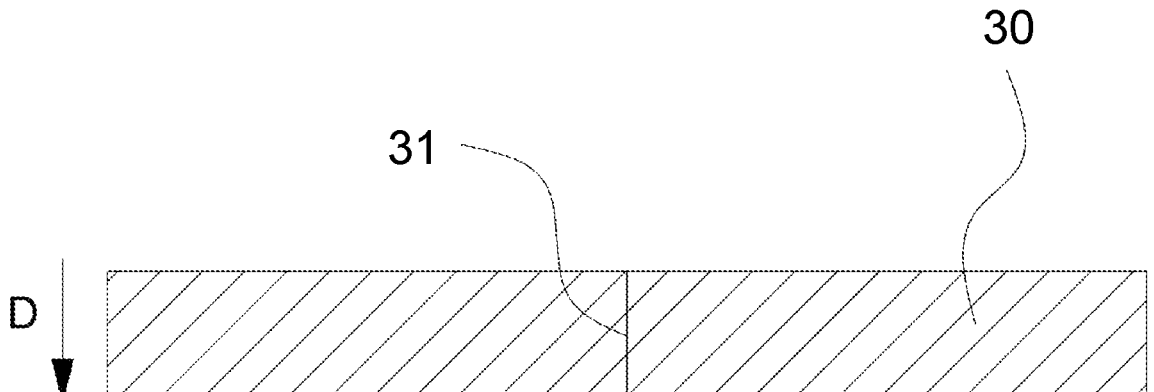
FIG. 12 is a schematic cross-sectional view of the protective patch of the battery according to an exemplary embodiment.

As shown in FIG. 12, the notch 31 penetrating through the protective patch 30 in a longitudinal direction is provided in a thickness direction D. The notch 31 may be considered as a cut in the middle of the protective patch 30, that is, no material removal is performed. Therefore, the notch 31 in this embodiment is different from a slit cut by material removal. Due to the notch 31 provided on the protective patch 30, the protective patch 30 is still an integral structure in a normal state. The notch 31 does not allow the chamber 111 to communicate with the outside space, and therefore, substances such as external gas or dust may not enter the chamber 111 through the notch 31, so that the protective patch 30 can reliably protect the explosion-proof valve 20. When the battery is tested for airtightness, an evacuation device may be connected to the battery, so that when the vacuum degree reaches a specific value, the protective patch 30 is deformed by the notch 31, and the notch 31 accordingly releases the chamber 111. That is, the chamber 111 may communicate with the evacuation device, and the testing of the airtightness of the battery may thus be implemented.

The total length of the notch 31 is a and the thickness of the protective patch 30 is b, where $5 \leq a/b \leq 100$ and $0.01$ mm$\leq b \leq 1.2$ mm. Therefore, it is ensured that the notch 31 can reliably seal the chamber 111 under normal conditions, and the notch 31 may open under a predetermined pressure, so as to be used for testing the airtightness of the battery.

In some embodiments, $25 \leq a/b \leq 80$, further, $25 \leq a/b \leq 60$, and further, $16 \leq a/b \leq 50$. The ratio a/b of the total length of the notch 31 to the thickness of the protective patch 30 may be 16, 17, 25, 30, 40, 45, 50, 60, 70, 75, 78, 80, and so on.

In some embodiments, $0.04$ mm$\leq b \leq 0.8$ mm, and further, $0.05$ mm$\leq b \leq 0.3$ mm. The thickness b of the protective patch 30 may be 0.05 mm, 0.06 mm, 0.07 mm, 0.075 mm, 0.1 mm, 0.125 mm, 0.188 mm, 0.25 mm, 0.26 mm, 0.3 mm, and so on.

The notch 31 in this embodiment allows the chamber 111 to communicate with the outside, so as to test the sealing performance of the cover plate 10 and the shell 50 and to determine whether the airtightness of the battery is good.

If the thickness of the protective patch 30 is excessively large, it may be difficult for the notch 31 to open during the airtightness testing process and the testing accuracy may be affected. If the thickness of the protective patch 30 is excessively small, the protective patch 30 may be in an open state under a natural state, and foreign objects such as electrolyte, water, metal swarf, dust, etc. may easily enter the inside of the protective patch 30, causing a battery safety risk. Further, if the ratio of the total length of the notch 31 to the thickness of the protective patch 30 is excessively small, it may be difficult for the notch 31 to open under a certain pressure, if the ratio of the total length of the notch 31 to the thickness of the protective patch 30 is excessively large, the length of the notch 31 is longer, or the thickness of the protective patch 30 is smaller, so that the protective patch 30 on both sides of the notch 31 cannot support each other, the notch 31 is easy to open in a natural state, and low structural strength is provided.

The greater the tensile strength of the protective patch 30 is, the less likely the protective patch 30 is to fracture, and the better the elasticity and plasticity are. The protective patch 30 can rebound after being deformed, and deformation may not be generated easily. After the battery is tested for airtightness, the protective patch 30 at the notch 31 can rebound, and the protective patch 30 on both sides of the notch 31 can support each other, so that it is difficult for foreign objects such as electrolyte, water, metal swarf, and dust to enter the inside of the protective patch 30. If the tensile strength of the protective patch 30 is excessively large and the plasticity of the material is excessively good, the two ends of the notch 31 on the protective patch 30 are not easy to be separated, and the sealing performance thus becomes excessively well, such that a larger pressure is required to open the notch 31 during the airtightness testing process of the battery, and that the testing result is affected, and false detection is prone to occur.

In this embodiment, the total length of the notch 31 is a and the thickness of the protective patch 30 is b, where 5≤a/b≤100 and 0.01 mm≤b≤1.2 mm, and the tensile strength of the protective patch 30 is c, where c/b=xb−1.073 and 160 (Mpa/mm$^2$)≤x≤175 (Mpa/mm$^2$). Therefore, it can be ensured that the notch 31 is in a closed state under a normal state, and the protective patch 30 on both sides of the notch 31 can support each other, such that the protective patch 30 is prevented from sagging, foreign objects are prevented from entering the inside of the explosion-proof valve 20, and the safety performance of the battery is thus improved. Moreover, during the airtightness testing process, the notch 31 may be opened smoothly, and the testing efficiency and accuracy of the airtightness testing is improved. Furthermore, the opening of the protective patch 30 may not excessively deform and may not affect the normal use of the protective patch 30 for a long time, so as to improve the service life of the protective patch 30.

The tensile strength test method of the protective patch 30 is: GB/T13542.2–2009, such that, the tensile strength of the protective patch 30 may be obtained as c, and the quotient of the tensile strength of the protective patch 30 and the thickness of the protective patch 30 is c/b=xb$^{-1.073}$, where 160 (Mpa/mm$^2$)≤x≤175 (Mpa/mm$^2$). In this way, the protective patch 30 may be made to have reliable strength to ensure that the notch 31 may reliably seal the chamber 111 under normal conditions. The protective patch 30 is prevented from being opened in a natural state, causing foreign objects such as electrolyte and water to enter the inside of the explosion-proof valve 20. Further, the notch 31 may open under a predetermined pressure, so as to be used for testing the airtightness of the battery.

Tensile strength may reflect the fracture resistance of the material and characterize the resistance of the material to the maximum uniform plastic deformation. The tensile strength of the protective patch 30 is independent of whether or not the notch 31 is provided on the protective patch 30, and the tensile strength of the protective patch 30 reflects the material properties of the protective patch 30 itself. The tensile strength test method GB/T 13542.2–2009 of the protective patch 30 may include the following.

1. Regarding the testing instruments, a material testing machine with a suitable range may be selected and equipped with a pair of clamps to clamp the sample. When a tensile load is applied, the clamps can be separated from each other at the speed specified by the product standard. The relative error of the indicated value of tensile load and elongation of the testing machine shall not be greater than 1%.

2. Regarding the test samples, five samples each with a length of approximately 200 mm and a width of 15 mm±1 mm may be selected in the longitudinal and transverse directions of the film. The measurement accuracy of the sample width is not less than 0.15 mm. Two marking lines with a distance of at least 50 mm are marked in the middle of each sample. If the product standard specifies the size of the sample otherwise, it shall be determined according to the product standard.

It should be noted that the sample tested may be the protective patch 30 without the notch 31, and the protective patch 30 may be cut from a large sheet of film. The tensile strength test in this embodiment may test the tensile strength of the entire film before the protective patch 30 is cut out, so as to reflect the tensile strength of the protective patch 30.

3. Regarding the thickness of each sample, the thickness of the sample may be obtained by the single-layer method.

(1) In accordance with ISO4593:1993, a precision micrometer, a vertical optical meter, or other instruments may be used to measure the thickness of a single sample.

(2) Regarding measuring instruments, when the film thickness is less than 100 um, a vertical optical meter or other suitable thickness gauge may be used for measurement. A flat cap with a diameter of 2 mm or a spherical cap with a radius of curvature of 25 mm to 50 mm is adopted. The measuring pressure is 0.5 N to 1 N. When the film thickness is greater than or equal to 100 um, a micrometer may be used for measurement. Instrument accuracy requirements: when the film thickness is less than 15 um, the accuracy is not less than 0.2 um, when the film thickness is greater than or equal to 15 um but less than 100 um, the accuracy is not less than 1 um, and when the film thickness is greater than or equal to 100 um, the accuracy is not less than 1 um.

(3) For measurement, three films with a width of approximately 100 mm in the width direction of the sample are cut (when the width of the film roll is less than 400 mm, a few more films may be appropriately selected), and the sample should not have wrinkles or other defects. The size of the sample used to measure the thickness and the size of the sample used to measure the tensile strength may not coincide.

The thickness of the sample is measured according to the requirements of ISO4593:1993. A total of 27 points are measured at equal distances on the sample, and the distance between the two measurement points is not less than 50 mm. For uncut film rolls, the measurement point should be 500 mm away from the film edge, and for edge-cut rolls, the measurement point should be 2 mm away from the film edge.

(4) Regarding the result, the median of 27 measurement points is selected as the test result, and the maximum and minimum values are reported.

4. Regarding the procedure, the length between the marking lines of the sample is measured to the nearest 1 mm. The distance between the clamps is adjusted to the value specified in the product standard. The sample is clamped between the two clamps flatly, so that the sample does not slip in the clamps when stretched and is not mechanically damaged by the clamps. The extensometer is installed so that the two jaws of the extensometer coincide with the two marking lines on the sample, and the jaws of the extensometer should not damage or distort the sample. According to the tensile speed specified in the product standard, the load is applied until the sample fractures, and the maximum load and the elongation between the two marking lines at the fracture of the sample are recorded. If the sample fractures at the jaw (not including fractures outside the marking lines), the test data is invalid, and another sample should be selected for the test.

5. Regarding the test result, c=p/bk, the unit of tensile strength c is megapascal (Mpa), the unit of maximum load p is Newton (N), the unit of sample thickness b is millimeter (mm), and the unit of sample width k is millimeter (mm).

In one embodiment, an air-pumping experiment and an air-blowing experiment are performed on the battery, so that the protective patch 30 may be accurately used for testing the airtightness of the battery. Further, under normal conditions, the protective patch 30 at the notch 31 support each other, preventing solid and liquid foreign objects from entering the inside of the protective patch 30 and causing battery safety risks.

In the air-pumping experiment, one cover plate 10 and one explosion-proof valve 20 were selected, and the explosion-proof valve 20 and the cover plate 10 were welded to prefabricate an explosion-proof valve 20 that leaks slightly. The airtightness test of the abovementioned cover plate 10 is performed. Protective patches 30 with the same shape and size and with different thicknesses and lengths of notches 31 were selected, attached, and sealed on the same explosion-proof valve 20 of the cover plate 10 for pumping test and helium gas detection. After being evacuated by a helium gas detection instrument, helium gas was introduced for detection. If there is leakage of helium gas, it is a qualified product, and if there is no leakage of helium gas, it is an unqualified product. The pumping test can confirm that the protective patch 30 that satisfies $5 \le a/b \le 100$, 0.01 mm$\le$b$\le$1.2 mm, c/b=xb$^{-1.073}$, and 160 (Mpa/mm$^2$)$\le$x$\le$175 (Mpa/mm$^2$) may be accurately used for airtightness testing.

In the air-blowing experiment, protective patches 30 of the same material and size and with notches 31 of different thicknesses and lengths were selected and attached to a transparent container to form an airtight environment. By blowing down the protective patches 30, the air pressure difference between the inside and outside was kept at 0.1 atmosphere, and it was observed whether the protective patches 30 at the notches sagged. Sagged protective patches 30 are unqualified product, and the protective patches 30 that do not sag are qualified products. The air-blowing experiment may show that the protective patch 30 provided with the notch 31 has a strong supporting ability, and it is not easy to cause the protective patch 30 to leak and open in the normal use state.

The above experimental test table may be provided as follows:

It can be seen from the above table that the protective patch 30 that simultaneously satisfies $5 \le a/b \le 100$, 0.01 mm$\le$b$\le$1.2 mm, c/b=xb$^{-1.073}$, and 160 (Mpa/mm$^2$)$\le$x$\le$175 (Mpa/mm$^2$) can satisfy both the air-pumping experiment and the air-blowing experiment.

In some embodiments, 165 (Mpa/mm$^2$)$\le$x$\le$171 (Mpa/mm$^2$), and further, 166 (Mpa/mm$^2$)$\le$x$\le$171 (Mpa/mm$^2$). x may be 165 (Mpa/mm$^2$), 166 (Mpa/mm$^2$), 167 (Mpa/mm$^2$), 168 (Mpa/mm$^2$), 168.25 (Mpa/mm$^2$), 168.52 (Mpa/mm$^2$), 169 (Mpa/mm$^2$) 170 (Mpa/mm$^2$) 170.5 (Mpa/mm$^2$), 171 (Mpa/mm$^2$), etc.

In an embodiment, the product of the tensile strength of the protective patch 30 and the thickness of the protective patch 30 is cb=sb+t, where 170 Mpa$\le$s$\le$185 Mpa, 1.3 (Mpa·mm)$\le$t$\le$2.5 (Mpa·mm). As such, the protective patch 30 may have reliable strength, and it is ensured that the notch 31 can reliably seal the chamber 111 under normal conditions, and the notch 31 may open under a predetermined pressure, so as to be used for testing the airtightness of the battery.

In some embodiments, 175 Mpa$\le$s$\le$180 Mpa and 1.5 (Mpa·mm)$\le$t$\le$2.2 (Mpa·mm), s may be 175 Mpa, 176 Mpa, 177 Mpa, 178 Mpa, 178.93 Mpa, 179 Mpa, 179.5 Mpa, 180 Mpa, etc., and t may be 1.5 (Mpa·mm), 1.6 (Mpa·mm), 1.7 (Mpa·mm), 1.8 (Mpa·mm), 1.9 (Mpa·mm), 1.9125 (Mpa·mm), 2 (Mpa·mm), 2.1 (Mpa·mm), 2.15 (Mpa·mm), 2.2 (Mpa·mm), etc.

The tensile strength test method of the protective patch 30 is: GB/T 13542.2–2009, and the tensile strength test table of the protective patch 30 under different thicknesses may be:

| Transverse tensile strength c (Mpa) | Longitudinal tensile strength c (Mpa) | Thickness b (mm) | Product cb | Quotient c/b |
|---|---|---|---|---|
| 210 | 210 | 0.05 | 10.5 | 4200.00 |
| 200 | 200 | 0.075 | 15 | 2666.67 |
| 200 | 200 | 0.1 | 20 | 2000.00 |
| 200 | 200 | 0.125 | 25 | 1600.00 |
| 190 | 190 | 0.188 | 35.72 | 1010.64 |
| 185 | 185 | 0.25 | 46.25 | 740.00 |

In an embodiment, the battery has a capacity ranging from 50 Ah to 280 Ah. When the internal pressure of the battery reaches a specific value, the explosion-proof valve 20 can be blasted, and the pressure of the battery is thus released. The protective patch 30 may reliably protect the explosion-proof

| Total length a (mm) of the notch | Thickness b (mm) of the protective patch 30 | a/b | x | Tensile strength c (Mpa) | Results of air-pumping experiment | Results of air-blowing experiment | Is it a qualified product |
|---|---|---|---|---|---|---|---|
| 0.25 | 0.005 | 50 | 168 | 247.3 | Qualified | Unqualified | No |
| 0.5 | 0.01 | 50 | 168 | 235.1 | Qualified | Qualified | Yes |
| 7.5 | 0.15 | 50 | 168 | 193.0 | Qualified | Qualified | Yes |
| 25 | 0.5 | 50 | 168 | 176.7 | Qualified | Qualified | Yes |
| 60 | 1.2 | 50 | 168 | 165.8 | Qualified | Qualified | Yes |
| 65 | 1.3 | 50 | 168 | 164.8 | Unqualified | Qualified | No |
| 2 | 0.5 | 4 | 168 | 176.7 | Unqualified | Qualified | No |
| 2.5 | 0.5 | 5 | 168 | 176.7 | Qualified | Qualified | Yes |
| 50 | 0.5 | 100 | 168 | 176.7 | Qualified | Qualified | Yes |
| 52.5 | 0.5 | 105 | 168 | 176.7 | Qualified | Unqualified | No |
| 25 | 0.5 | 50 | 159 | 167.3 | Unqualified | Qualified | No |
| 25 | 0.5 | 50 | 160 | 168.3 | Qualified | Qualified | Yes |
| 25 | 0.5 | 50 | 175 | 184.1 | Qualified | Qualified | Yes |
| 25 | 0.5 | 50 | 176 | 185.1 | Qualified | unqualified | no | valve 20, and the explosion-proof valve 20 is thus prevented from being damaged under normal use. The capacity of the battery may form a specific relationship with the area of the protective patch 30. For instance, if the capacity of the battery increases, the area of the protective patch 30 may increase accordingly.

In some embodiments, the capacity of the battery may range from 72 Ah to 172 Ah. The capacity of the battery may be 50 Ah, 60 Ah, 70 Ah, 71 Ah, 72 Ah, 75 Ah, 80 Ah, 100 Ah, 120 Ah, 150 Ah, 160 Ah, 161 Ah, 162 Ah, 165 Ah, 168 Ah, 170 Ah, 172 Ah, 180 Ah, 200 Ah, 250 Ah, 280 Ah, etc.

In an embodiment, the battery has an energy density ranging from 120 wh/kg to 300 wh/kg. When the internal pressure of the battery reaches a specific value, the explosion-proof valve 20 can be blasted, so as to achieve reliable pressure relief of the battery. The protective patch 30 may reliably protect the explosion-proof valve 20, and the explosion-proof valve 20 is thus prevented from being damaged under normal use.

The battery may be a lithium iron phosphate battery, and the energy density of the lithium iron phosphate battery may be 120 wh/kg to 190 wh/kg. The energy density of the lithium iron phosphate battery may be 120 wh/kg, 121 wh/kg, 125 wh/kg, 140 wh/kg, 150 wh/kg, 160 wh/kg, 170 wh/kg, 180 wh/kg, 185 wh/kg, 188 wh/kg, 190 wh/kg etc.

The battery may be a ternary system battery, and the energy density of the ternary system battery may be 200 wh/kg to 300 wh/kg. The energy density of the ternary system battery may be: 200 wh/kg, 201 wh/kg, 210 wh/kg, 220 wh/kg, 230 wh/kg, 240 wh/kg, 248 wh/kg, 250 wh/kg, 260 wh/kg, 270 wh/kg, 280 wh/kg, 290 wh/kg, 295 wh/kg, 298 wh/kg, 300 wh/kg, etc.

In an embodiment, a ratio of an area enclosed by a circumferential edge of the protective patch 30 to an area enclosed by a circumferential edge of the cover plate 10 is d, where $0.05 \leq d \leq 0.2$. As such, the protective patch 30 can effectively protect the explosion-proof valve 20, and the problem that the area of the protective patch 30 is excessively large can also be avoided.

In one embodiment, $0.1 \leq d \leq 0.15$ not only prevents the protective patch 30 from being excessively large, but also enables the protective patch 30 to achieve reliable protection for the explosion-proof valve 20.

The ratio d of the area enclosed by the circumferential edge of the protective patch 30 to the area enclosed by the circumferential edge of the cover plate 10 may be 0.1, 0.11, 0.12, 0.13, 0.14, 0.15, etc.

In an embodiment, the area enclosed by the circumferential edge of the protective patch 30 is e, where $800 \text{ mm}^2 \leq e \leq 950 \text{ mm}^2$. Further, $850 \text{ mm}^2 < e \leq 900 \text{ mm}^2$, so that the protective patch 30 can have a sufficient protection area, and the area of the protective patch 30 may not be excessively large, and that the use performance of the protective patch 30 may be improved.

The area e enclosed by the circumferential edge of the protective patch may be $850 \text{ mm}^2$, $855 \text{ mm}^2$, $860 \text{ mm}^2$, $870 \text{ mm}^2$, $880 \text{ mm}^2$, $890 \text{ mm}^2$, $895 \text{ mm}^2$, $896 \text{ mm}^2$, $898 \text{ mm}^2$, $900 \text{ mm}^2$, etc.

In an embodiment, the protective patch 30 may be configured to be connected to an evacuation device, such that when a vacuum degree of a space where the protective patch 30 is located is g, an opening area of the notch 31 is f, where $1 \times 10^{-2} \text{ Pa} \leq g \leq 4.5 \times 10^{-2} \text{ Pa}$ and $0.8 \text{ mm}^2 \leq f \leq 2 \text{ mm}^2$. Further, $2 \times 10^{-2} \text{ Pa} \leq g \leq 3 \times 10^{-2} \text{ Pa}$ and $1.2 \text{ mm}^2 \leq f \leq 1.7 \text{ mm}^2$, such that when the airtightness of the battery is tested, the evacuation device can reliably open the notch 31, such that the chamber 111 is released, so as to prevent the problem that the protective patch 30 is damaged due to an excessively large opening area of the notch 31. The evacuation device may be a vacuum pump.

The vacuum degree g of the space where the protective patch 30 is located may be $2 \times 10^{-2} \text{ Pa}$, $2.1 \times 10^{-2} \text{ Pa}$, $2.2 \times 10^{-2} \text{ Pa}$, $2.3 \times 10^{-2} \text{ Pa}$, $2.5 \times 10^{-2} \text{ Pa}$, $2.6 \times 10^{-2} \text{ Pa}$, $2.8 \times 10^{-2} \text{ Pa}$, $2.9 \times 10^{-2} \text{ Pa}$, $3 \times 10^{-2} \text{ Pa}$, etc.

The opening area f of the notch 31 may be $1.2 \text{ mm}^2$, $1.3 \text{ mm}^2$, $1.4 \text{ mm}^2$, $1.472 \text{ mm}^2$, $1. \text{ mm}^2$, $1. \text{ mm}^2$, $1.65 \text{ mm}^2$, $1.68 \text{ mm}^2$, $1.7 \text{ mm}^2$, etc.

Figure 2:
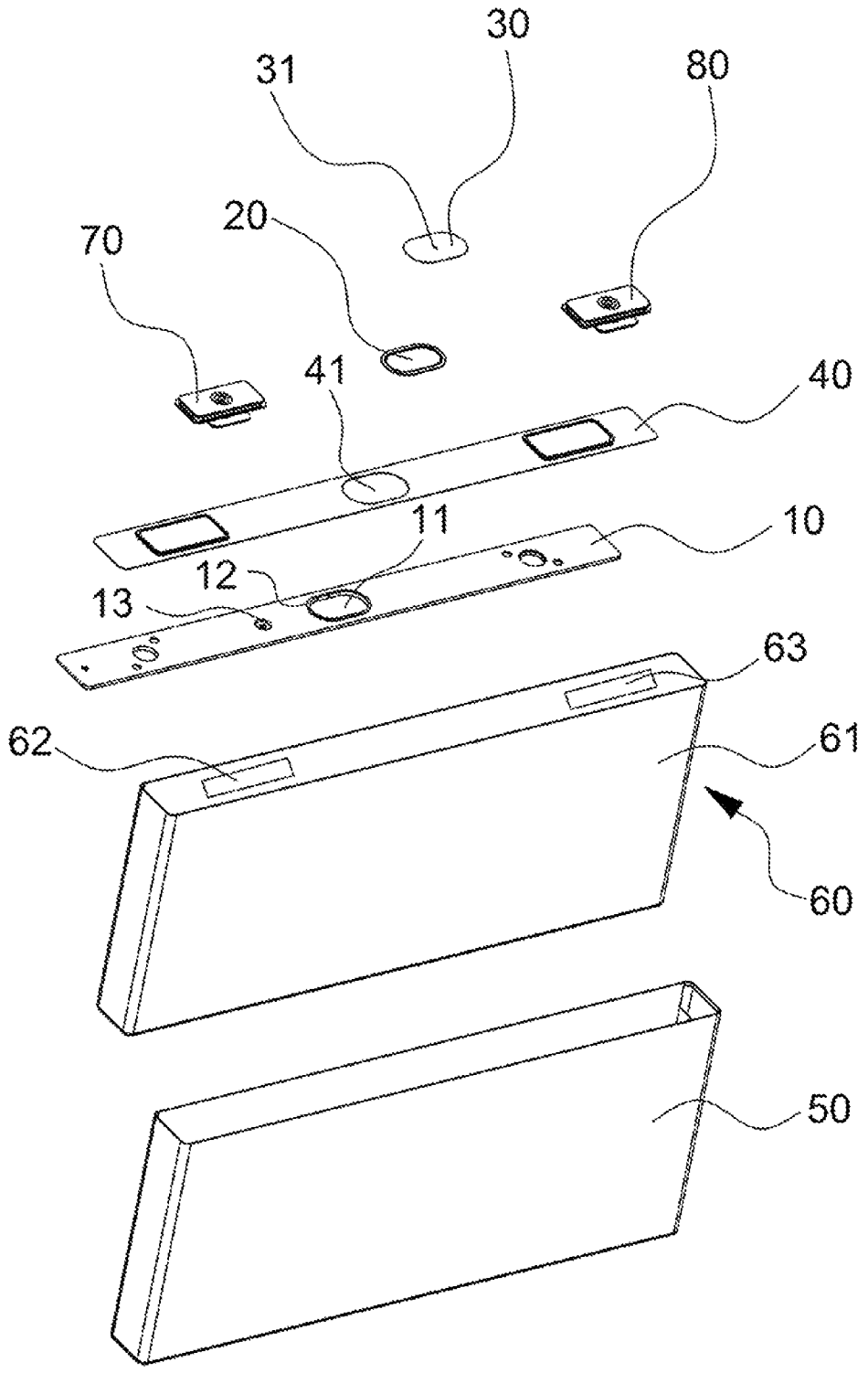
FIG. 2 is an exploded schematic explosive view of the battery according to an exemplary embodiment.
Figure 3:
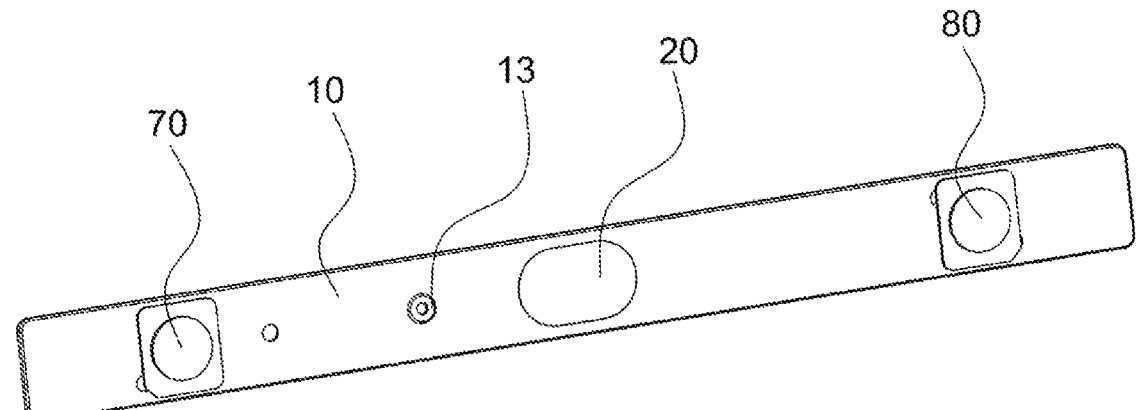
FIG. 3 is a schematic view of a portion of the battery according to an exemplary embodiment.
Figure 5:
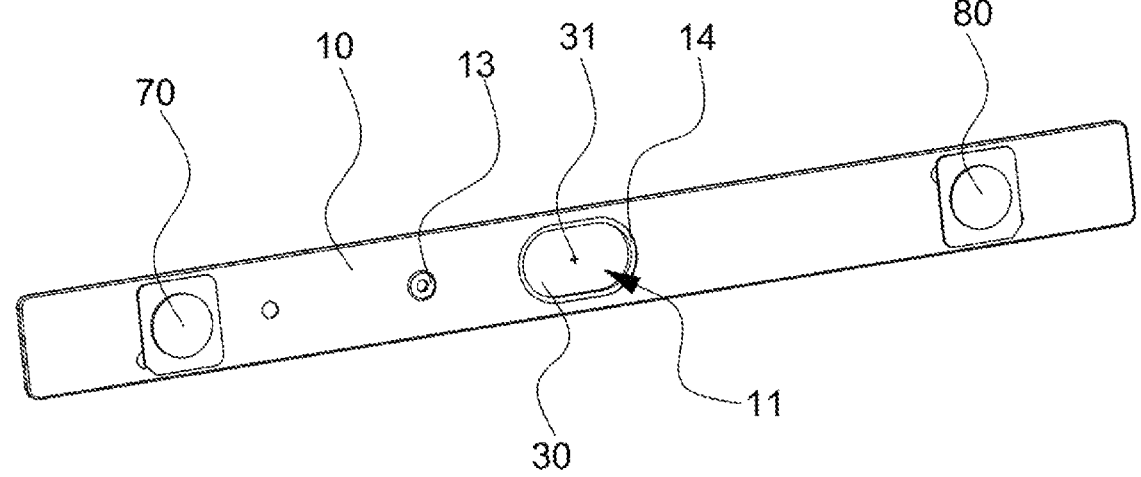
FIG. 5 is a schematic view of another portion of the battery according to an exemplary embodiment.

In an embodiment, as shown in FIG. 2, FIG. 3, and FIG. 5, a liquid injection hole 13 is arranged on the cover plate 10, and a minimum distance between the liquid injection hole 13 and the protective patch 30 is not less than 5 mm. The electrolyte may be injected through the liquid injection hole 13, and the electrolyte may be prevented from flowing to the position of the protective patch 30 during the liquid injection process, so as to ensure the service life of the protective patch 30 and the explosion-proof valve 20.

In some embodiments, the distance between the liquid injection hole 13 and the protective patch 30 is 10 mm-25 mm, and in this way, a sufficient safety distance is provided between the liquid injection hole 13 and the protective patch 30, and the liquid injection hole 13 and the protective patch 30 may both be reasonably arranged.

The distance between the liquid injection hole 13 and the protective patch 30 may be 10 mm, 11 mm, 12 mm, 15 mm, 16 mm, 17 mm, 18 mm, 19 mm, 22 mm, 23 mm, 24 mm, 25 mm, etc.

It should be noted that, after the electrolyte is injected through the liquid injection hole 13, the liquid injection hole 13 may be reliably sealed by a sealing nail.

In an embodiment, the notch 31 is located at the center of the protective patch 30, so that the protective patch 30 can reliably protect the explosion-proof valve 20, and the notch 31 can also be reliably used to test the airtightness of the battery.

In an embodiment, the notch 31 includes a first notch segment 311 and a second notch segment 312, and the first notch segment 311 intersects with the second notch segment 312. As such, when the battery is tested for airtightness, the evacuation device may reliably open the first notch segment 311 and the second notch segment 312, thereby realizing the release of the chamber 111.

In an embodiment, the first notch segment 311 is perpendicular to the second notch segment 312, so as to ensure that the first notch segment 311 and the second notch segment 312 may be opened under a predetermined pressure. Further, after the pressure is released, the first notch segment 311 and the second notch segment 312 may be restored to the original state, that is, the first notch segment 311 and the second notch segment 312 enclose the chamber 111.

In an embodiment, a middle portion of the first notch segment 311 intersects with a middle portion of the second notch segment 312, so as to further ensure that the first notch segment 311 and the second notch segment 312 may be opened under a predetermined pressure. Further, after the pressure is released, the first notch segment 311 and the second notch segment 312 may be restored to the original state, that is, the first notch segment 311 and the second notch segment 312 enclose the chamber 111.

Figure 6:
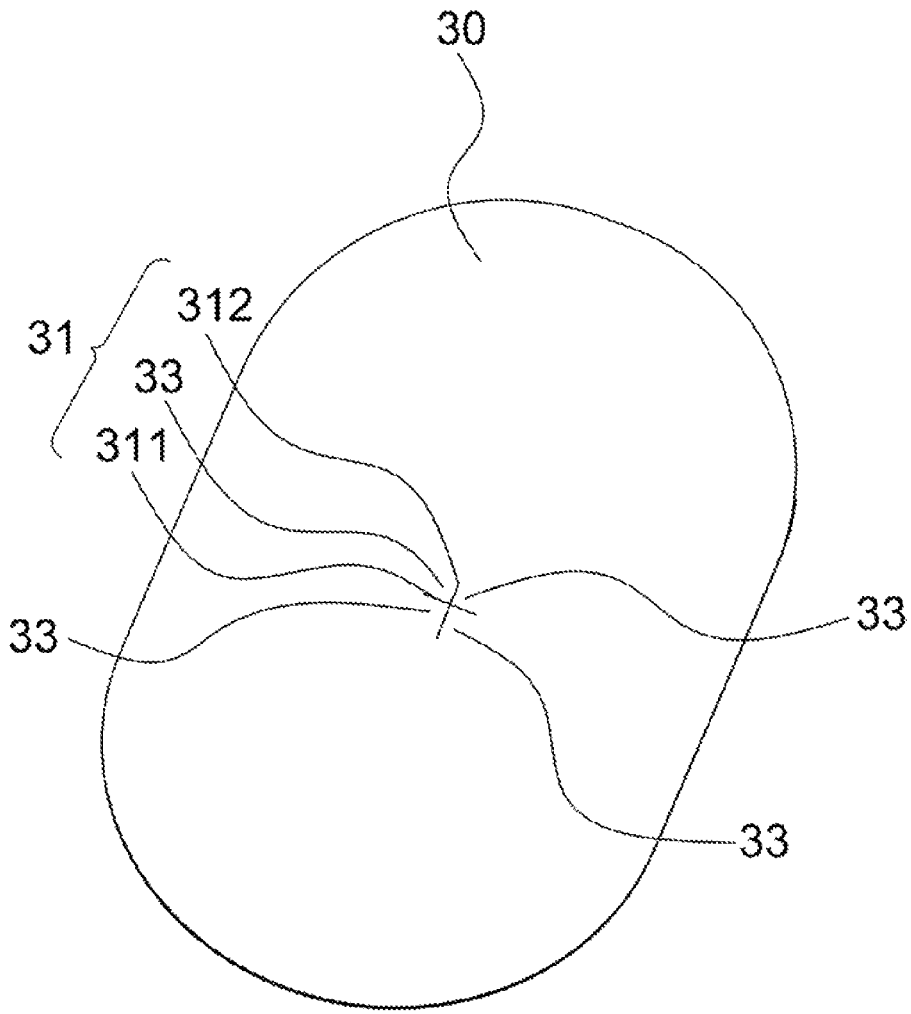
FIG. 6 is a schematic view of a protective patch of the battery according to a first exemplary embodiment.

As shown in FIG. 6, the notch 31 formed by the first notch segment 311 and the second notch segment 312 may be cross-shaped.

In an embodiment, a length of the first notch segment 311 and a length of the second notch segment 312 are consistent, and in this way, the manufacturing process is simple, and it may be ensured that the first notch segment 311 and the second notch segment 312 may be opened synchronously when the battery is tested for airtightness. The length of the first notch segment 311 and the second notch segment 312 may both be 2 mm.

In some embodiments, it is not excluded that the length of the first notch segment 311 and the length of the second notch segment 312 are inconsistent.

Figure 7:
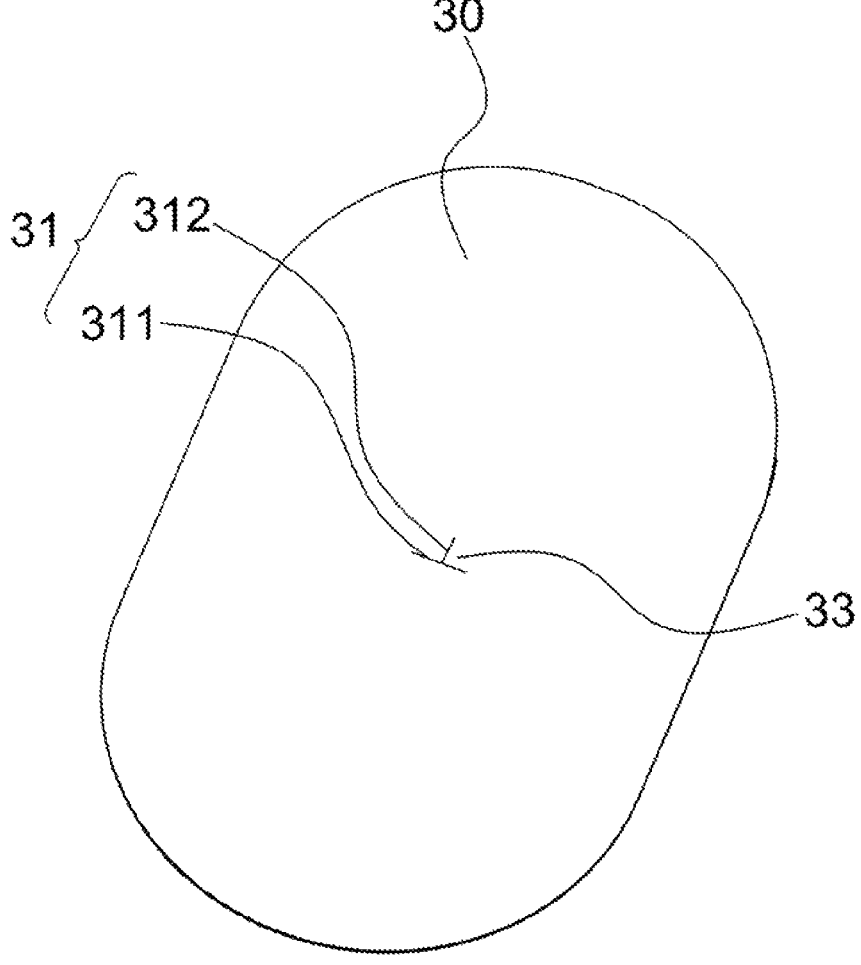
FIG. 7 is a schematic view of the protective patch of the battery according to a second exemplary embodiment.

In some embodiments, as shown in FIG. 7, the notch 31 formed by the first notch segment 311 and the second notch segment 312 may be T-shaped.

Figure 8:
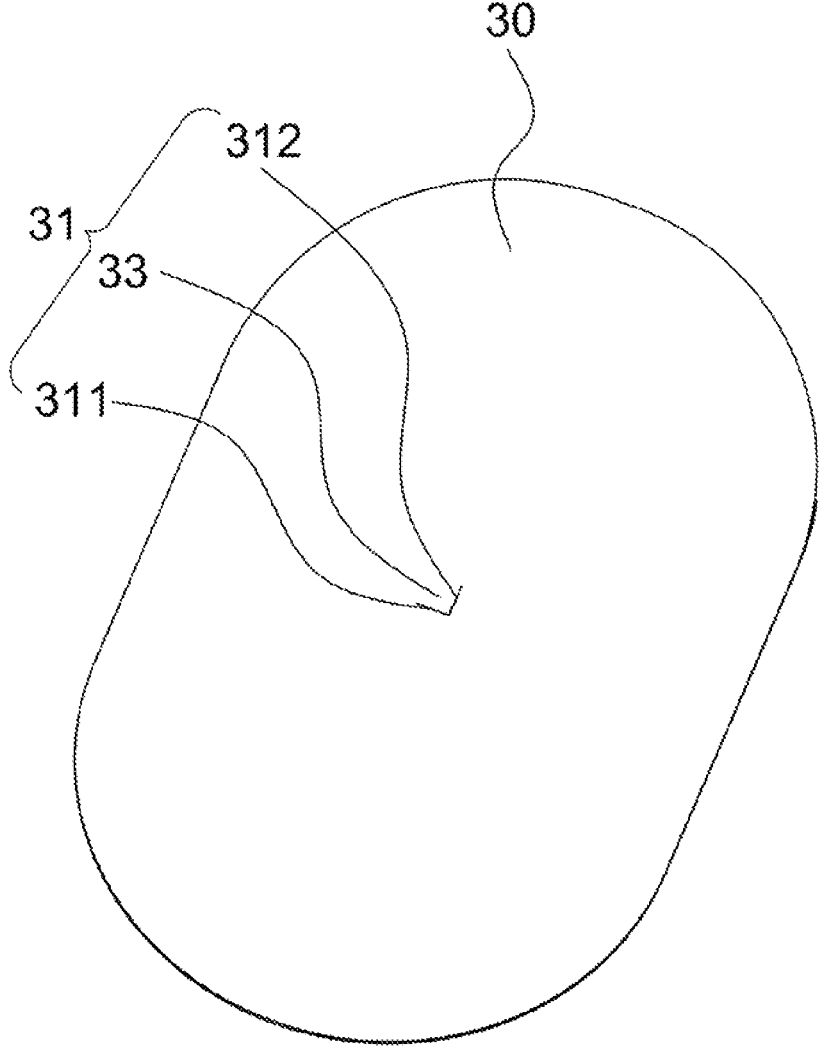
FIG. 8 is a schematic view of the protective patch of the battery according to a third exemplary embodiment.

In some embodiments, as shown in FIG. 8, the notch 31 formed by the first notch segment 311 and the second notch segment 312 may be L-shaped.

Figure 9:
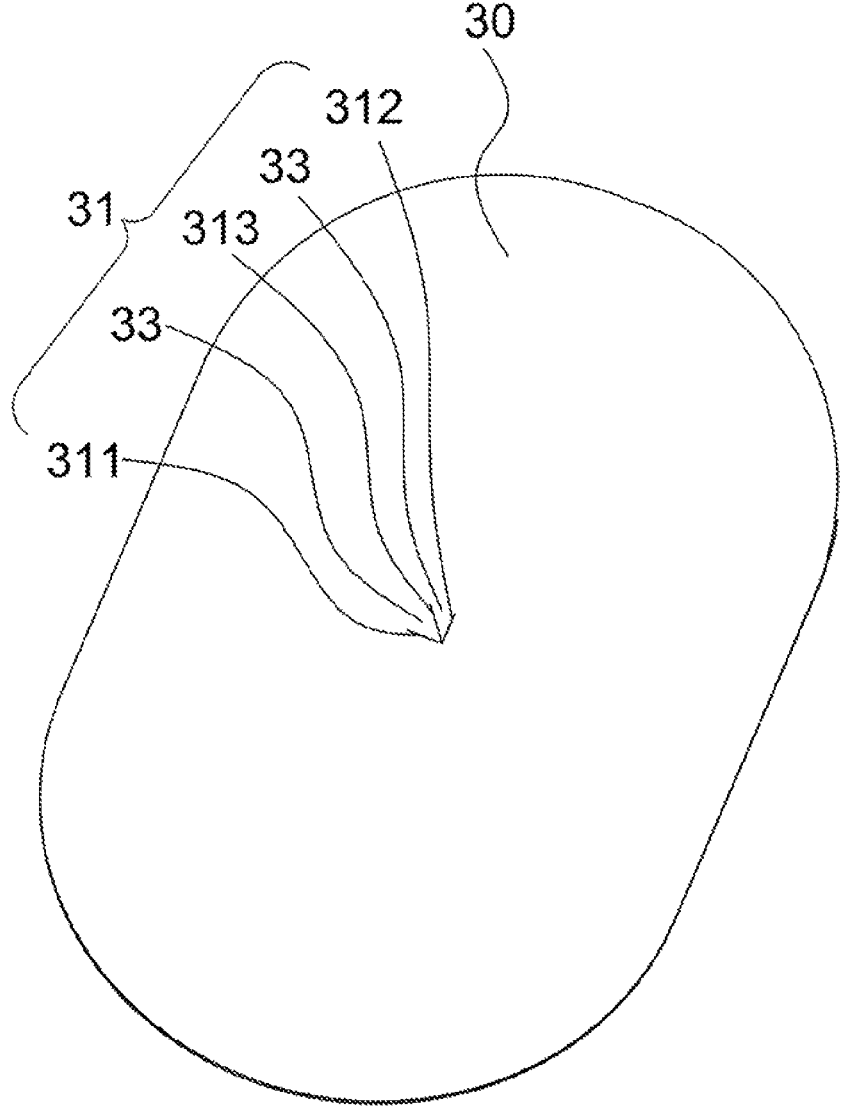
FIG. 9 is a schematic view of the protective patch of the battery according to a fourth exemplary embodiment.

In some embodiments, as shown in FIG. 9, the notch 31 may further include a third notch segment 313, and the first notch segment 311, the second notch segment 312, and the third notch segment 313 may form a Y-shaped.

In an embodiment, as shown in FIG. 6 to FIG. 9, the intersecting first notch segment 311 and the second notch segment 312 form at least one cantilever portion 33 on the protective patch 30. The protective patch 30 may be configured to be connected to an evacuation device, such that when the vacuum degree of the space where the protective patch 30 is located is g, an open angle of the cantilever portion 33 is h, where $1 \times 10^{-2}$ Pa≤g≤$4.5 \times 10^{-2}$ Pa and $5° \leq h \leq 50°$. Further, $2 \times 10^{-2}$ Pa≤g≤$3 \times 10^{-2}$ Pa and $15° \leq h \leq 45°$, so that when the airtightness of the battery is tested, the evacuation device can reliably open the notch 31, such that the chamber 111 is released, and the problem that the protective patch 30 is damaged due to an excessively large opening area of the notch 31 is also prevented from occurring. The evacuation device may be a vacuum pump.

The vacuum degree g of the space where the protective patch 30 is located may be $2 \times 10^{-2}$ Pa, $2.1 \times 10^{-2}$ Pa, $2.2 \times 10^{-2}$ Pa, $2.3 \times 10^{-2}$ Pa, $2.5 \times 10^{-2}$ Pa, $2.6 \times 10^{-2}$ Pa, $2.8 \times 10^{-2}$ Pa, $2.9 \times 10^{-2}$ Pa, $3 \times 10^{-2}$ Pa, etc.

The open angle h of the cantilever portion 33 may be 5°, 6°, 8°, 10°, 12°, 13°, 15°, 16°, 18°, 20°, 22°, 23°, 25°, 30°, 31°, 32°, 33°, 35°, 36°, 38°, 40°, 42°, 43°, 45°, 46°, 48°, 49°, or 50° etc.

It is noted that the first notch segment 311 intersects with the second notch segment 312, that is, the at least one cantilever portion 33 is formed on the protective patch 30 through the first notch segment 311 and the second notch segment 312. When testing the airtightness of the battery, the notch 31 is used to achieve the communication between chamber 111 and the outside. In the actual test process, when the pressure reaches a certain value, the cantilever portion 33 is deformed and folded upwards, that is, the cantilever portion 33 is opened, so that the sealed chamber 111 may communicate with the outside through the notch 31.

As shown in FIG. 6 to FIG. 9, in the thickness direction of the protective patch 30, the notch 31 penetrating the protective patch 30 is provided. As such, at least one cantilever portion 33 is formed on the protective patch 30, that is, the notch 31 may include at least two straight notch segments, or at least one curved notch segment. In this way, the cantilever portion 33 forms a foldable structure, for example, the cantilever portion 33 may be a triangular structure. Herein, the cantilever portion 33 may be folded along one side, so that the cantilever portion 33 may be in an open state under the action of a predetermined pressure, and that the notch 31 releases the chamber 111. That is, the chamber 111 may communicate with the evacuation device, and the testing of the airtightness of the battery may thus be implemented.

Figure 10:
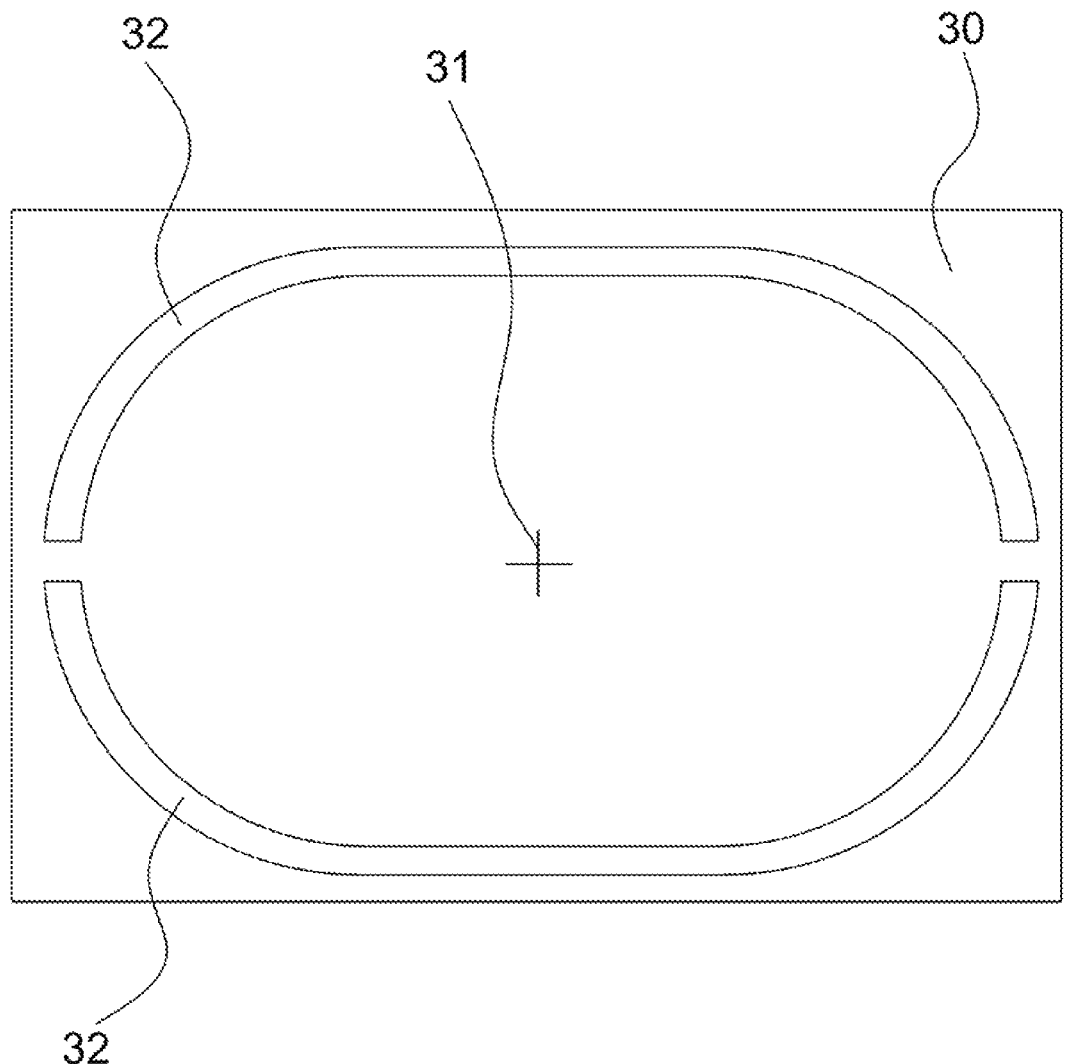
FIG. 10 is a schematic view of the protective patch of the battery according to a fifth exemplary embodiment.

In an embodiment, as shown in FIG. 10, an identification portion 32 is arranged on the protective patch 30, so that whether the battery is provided with the protective patch 30 may be determined through the identification portion 32, and the problem of absence of the protective patch 30 is thereby avoided.

The identification portion 32 may be a structural identification portion, for example, the structural identification portion may be a protruding structure, or the structural identification portion may be a stripe with graphics or the like. The identification portion 32 may also be a color identification portion, for example, the protective patch 30 is coated with an easily visible color, for example, red, green, blue or yellow, and the like.

In an embodiment, the protective patch 30 and the cover plate 10 are connected to each other through an adhesive portion, and at least a portion of the adhesive portion is the identification portion 32. Herein, the protective patch 30 is a transparent member 30, and the color of the adhesive portion is not consistent with the color of the protective patch 30, such that the adhesive portion is revealed through the protective patch 30, and that an operator may judge whether the battery is provided with the protective patch 30 by the color of the adhesive portion.

It is noted that the protective patch 30 is a transparent member 30, and the color of the adhesive portion may be red, green, blue, yellow, or the like. In this way, the color of the adhesive portion may be seen through the protective patch 30, so that an operator can judge whether the battery is provided with the protective patch 30 by the color of the adhesive portion.

A circle of colored adhesive portion may be arranged on the protective patch 30, so that the protective patch 30 may be adhered through this adhesive portion. The colored adhesive portion may be formed by mixing pigments, which is not limited herein.

In an embodiment, the adhesive portion includes a first adhesive portion and a second adhesive portion. The first adhesive portion is the identification portion 32, and the first adhesive portion covers a portion of the protective patch 30. One portion of the second adhesive portion covers the first adhesive portion, and another portion of the second adhesive portion covers the protective patch 30, so that the second adhesive portion is adhered to the cover plate 10. In this way, it can be ensured that the protective patch 30 is reliably arranged on the cover plate 10, and an operator may judge whether the battery is provided with the protective patch 30 by the color of the first adhesive portion.

As shown in FIG. 10, at least two first adhesive portions may be provided, and the first adhesive portions are arranged at intervals, so that the protective patch 30 between the two adjacent first adhesive portions is exposed, and the exposed protective patch 30 may be provided with the second adhesive portion.

Figure 11:
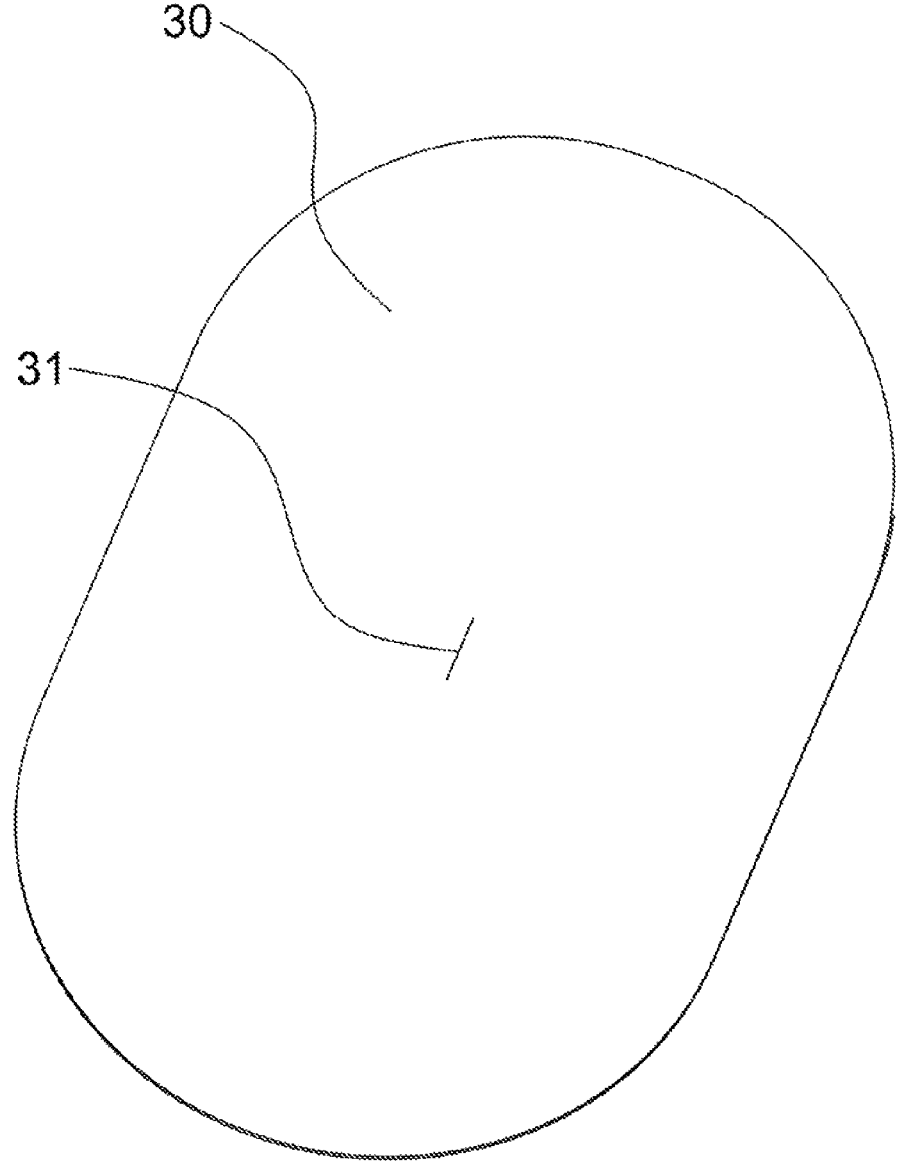
FIG. 11 is a schematic view of the protective patch of the battery according to a sixth exemplary embodiment.

In one embodiment, as shown in FIG. 11, the notch 31 may be in a straight line.

In an embodiment, as shown in FIG. 2, a reinforcement ring 12 is arranged on the cover plate 10, and the reinforcement ring 12 is arranged on an outer surface of the cover plate 10 and surrounds the explosion-proof hole 11. The protective patch 30 is arranged on a surface of the reinforcement ring 12 facing away from the cover plate 10. Therefore, the protective patch 30 may be conveniently arranged on the reinforcement ring 12, and the reinforcement ring 12 may reliably strengthen the cover plate 10 to ensure the structural strength of the cover plate 10 and prevent the cover plate 10 from fracturing.

In an embodiment, as shown in FIG. 1 and FIG. 2, the battery pack further includes an insulating top cover 40. The insulating top cover 40 is arranged on the outer surface of the cover plate 10, and a through hole 41 opposite to the explosion-proof hole 11 is arranged on the insulating top cover 40. Herein, an upper surface of the insulating top cover 40 is flush with an upper surface of the protective patch 30. The insulating top cover 40 may provide reliable insulating performance, and as the protective patch 30 may reliably protect the explosion-proof valve 20, it can also ensure that the top of the battery is relatively flat.

It is noted that the insulating top cover 40 covers the outer surface of the cover plate 10, and as the insulating top cover 40 may reliably protect the cover plate 10, problems such as electrical connection may be avoided, and the safety performance of the battery is thereby ensured.

In an embodiment, the reinforcement ring 12 is arranged on the cover plate 10, and the reinforcement ring 12 is arranged on the outer surface of the cover plate 10 and surrounds the explosion-proof hole 11. The reinforcement ring 12 is located in the through hole 41, so that the protective patch 30 may be conveniently arranged on the reinforcement ring 12.

In an embodiment, a gap is provided between the reinforcement ring 12 and a hole wall of the through hole 41, so that the insulating top cover 40 may be conveniently installed on the cover plate 10, and problems such as interference between the insulating top cover 40 and the reinforcement ring 12 are prevented from occurring.

It is noted that the installation of the insulating top cover 40 may be performed after the protective patch 30 is arranged on the reinforcement ring 12, so a gap is provided between the reinforcement ring 12 and the hole wall of the through hole 41. Further, the gap between the protective patch 30 and the hole wall of the through hole 41 may avoid interference between the insulating top cover 40 and the reinforcement ring 12 or the protective patch 30.

In an embodiment, the battery pack further includes the insulating top cover 40. The insulating top cover 40 is arranged on the outer surface of the cover plate 10, and the through hole 41 opposite to the explosion-proof hole 11 is arranged on the insulating top cover 40. Herein, the protective patch 30 covers a portion of the insulating top cover 40, so that the connection surface of the protective patch 30 can be larger, the connection stability of the protective patch 30 is improved, and the protection of the insulating top cover 40 can be achieved by the protective patch 30.

In an embodiment, at least part of the explosion-proof valve 20 is located in the explosion-proof hole 11, so that the installation reliability of the explosion-proof valve 20 is ensured, and the explosion-proof valve 20 may be protected.

In an embodiment, as shown in FIG. 3 to FIG. 5, an installation groove 14 is arranged on an inner surface of the cover plate 10, and the installation groove 14 surrounds explosion-proof hole 11. The explosion-proof valve 20 is connected to a groove wall of the installation groove 14, so as to reliably connect the explosion-proof valve 20 to the cover plate 10.

The circumferential outer edge of the explosion-proof valve 20 may reliably contact a side wall of the installation groove 14, so that the explosion-proof valve 20 is positioned, and it can be ensured that the explosion-proof valve 20 may be reliably fixed in the installation groove 14.

In an embodiment, as shown in FIG. 1 and FIG. 2, the battery further includes a shell 50, a cell 60, a first terminal component 70, and a second terminal component 80. The cover plate 10 is connected to the shell 50. The cell 60 is arranged in the cover plate 10 and the shell 50, and the cell 60 includes a cell body 61, a first tab 62, and a second tab 63. The first terminal component 70 is arranged on the cover plate 10 and is connected to the first tab 62. The second terminal component 80 is arranged on the cover plate 10 and is connected to the second tab 63. Herein, the explosion-proof hole 11 is located between the first terminal component 70 and the second terminal component 80. That is, the protective patch 30 is located between the first terminal component 70 and the second terminal component 80, so that various components may be reasonably distributed on the cover plate 10.

The battery includes the cell and an electrolyte, and the battery is the smallest unit capable of performing electrochemical reactions such as charging/discharging. The cell refers to a unit formed by winding or laminating a stacked part, and the stacked part includes a first electrode, a separator, and a second electrode. When the first electrode is a positive electrode, the second electrode is a negative electrode. The polarities of the first electrode and the second electrode may be interchanged.

The first tab 62 may be directly connected to the first terminal component 70. For instance, the first tab 62 and the first terminal component 70 may be directly welded, or the first tab 62 and the first terminal component 70 may be connected through a transition piece. The second tab 63 may be directly connected to the second terminal component 80. For instance, the second tab 63 and the second terminal component 80 may be directly welded, or the second tab 63 and the second terminal component 80 may be connected through a transition piece.

In some embodiments, the first tab 62 and the second tab 63 extend from opposite ends of the cell body 61.

In some embodiments, as shown in FIG. 2, the first tab 62 and the second tab 63 extend from one end of the cell body 61 towards the cover plate 10. In this way, the first tab 62 and the second tab 63 may be conveniently connected to the first terminal component 70 and the second terminal component 80 subsequently.

In an embodiment, the protective patch 30 may be may be at least one of polyethylene terephthalate (PET), a polytrimethylene terephthalate (abbreviated as PTT) layer, a polypropylene (abbreviated as PP) layer, and a polycarbonate (abbreviated as PC) layer, which is not limited herein.

In one embodiment, the battery is a square battery.

An embodiment of the disclosure further provides a battery apparatus including the abovementioned battery.

The battery apparatus provided by an embodiment of the disclosure includes the battery, and the battery includes the cover plate 10, the explosion-proof valve 20, and the protective patch 30. The explosion-proof hole 11 is arranged on the cover plate 10, the explosion-proof valve 20 is arranged on the cover plate 10 and shields the explosion-proof hole 11. By arranging the protective patch 30 on the outer surface of the cover plate 10 and shielding the explosion-proof hole 11, the protective patch 30 can safeguard the explosion-proof valve 20 to protect the explosion-proof valve 20, and the life and safety of the explosion-proof valve 20 is thereby improved. The notch 31 penetrating through the protective patch 30 in a longitudinal direction is arranged on the protective patch 30. In this way, the notch 31 is in a closed state under normal conditions, that is, the chamber 111 is a sealed chamber. When the battery is tested for airtightness, the notch 31 can be in an open state when a predetermined pressure is applied, such that the chamber 111 is an unsealed chamber. Through the arrangement of the notch 31, the explosion-proof valve 20 is effectively protected under normal use. The notch 31 may further be used for the airtightness testing of the battery to accordingly improve the performance of the battery apparatus.

In an embodiment, the battery apparatus is a battery module or a battery pack.

The battery module includes a plurality of batteries, and the battery module may further include end plates, and side plates. The end plates and the side plates are configured to secure the batteries.

The battery apparatus also includes a battery box, and the battery is arranged in the battery box. A plurality of batteries may be formed into a battery module and then arranged in the battery box, and the plurality of batteries may be secured by the end plates and the side plates. The plurality of batteries may be directly disposed in the battery box, that is, the plurality of batteries are not required to be arranged into groups, and the end plates and the side plates may be removed at this time.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery, comprising:

a cover plate, wherein an explosion-proof hole is arranged on the cover plate;

an explosion-proof valve, wherein the explosion-proof valve is arranged on the cover plate to shield the explosion-proof hole; and a protective patch, wherein the protective patch is located on an outer side of the cover plate and shields the explosion-proof hole, a chamber is formed between the explosion-proof valve and the protective patch, and a notch penetrating through the protective patch is arranged on the protective patch in a thickness direction, the notch is convertible between a closed state under normal conditions and an open state when a predetermined pressure is applied, such that when the notch is in the closed state, the chamber is a sealed chamber, and when the predetermined pressure is applied, the notch is in the open state, and the chamber is an unsealed chamber and communicates with an outside through the notch, wherein the notch has a total length of a and the protective patch has a thickness of b, where $5 \le a/b \le 100$ and $0.01$ mm $\le b \le 1.2$ mm, the protective patch has a tensile strength of c, where $c/b = xb^{-1.073}$ and 160 (Mpa/mm$^2$) $\le x \le 175$ (Mpa/mm$^2$), and a tensile strength test method applied to the protective patch is: GB/T 13542.2–2009, wherein a reinforcement ring is arranged on the cover plate, the reinforcement ring is arranged on an outer surface of the cover plate and surrounds the explosion-proof hole, the protective patch is arranged on a surface of the reinforcement ring facing away from the cover plate, and a hole wall of the explosion-proof hole, the explosion-proof valve, and the protective patch together enclose the chamber, the battery further comprising an insulating top cover, wherein the insulating top cover is fixedly arranged on the outer surface of the cover plate, a through hole opposite to the explosion-proof hole is arranged on the insulating top cover, and an upper surface of the insulating top cover is flush with an upper surface of the protective patch, the reinforcement ring is located in the through hole of the insulating top cover, a gap is provided between the reinforcement ring and a hole wall of the through hole, and an interval is formed between the hole wall of the through hole and a circumferential outer edge of the protective patch, the notch is a cut formed without material removal such that the notch is normally in the closed state to seal the chamber, and the notch relies on elastic deformation to convert to the open state, the notch is located in a center of the protective patch, the notch comprises a first notch segment and a second notch segment, the first notch segment intersects with the second notch segment, and/or a middle portion of the first notch segment intersects with a middle portion of the second notch segment, the intersecting first notch segment and the second notch segment form at least one cantilever portion on the protective patch, the protective patch is configured to be connected to an evacuation device, such that when a vacuum degree of a space where the protective patch is located is g, an open angle of the cantilever portion is h, where $1 \times 10^{-2}$ Pa $\le g \le 4.5 \times 10^{-2}$ Pa and $5° \le h \le 5020$ .

2. The battery according to claim 1, wherein cb=sb+t, s=178.93 Mpa, and 1.3 (Mpa·mm) $\le t \le 2.5$ (Mpa·mm).

3. The battery according to claim 1, wherein a ratio of an area enclosed by a circumferential edge of the protective patch to an area enclosed by a circumferential edge of the cover plate is d, where $0.05 \le d \le 0.2$.

4. The battery according to claim 3, wherein the area enclosed by the circumferential edge of the protective patch is e, where 800 mm$^2$ $\le e \le 950$ mm$^2$.

5. The battery according to claim 3, wherein the battery has a capacity ranging from 50 Ah to 280 Ah, or the battery has an energy density ranging from 120 wh/kg to 300 wh/kg.

6. The battery according to claim 1, wherein the protective patch is configured to be connected to an evacuation device, such that when a vacuum degree of a space where the protective patch is located is g, an opening area of the notch is f, where $1 \times 10^{-2}$ Pa $\le g \le 4.5 \times 10^{-2}$ Pa and 0.8 mm$^2$ $\le f \le 2$ mm$^2$.

7. The battery according to claim 1, wherein a liquid injection hole is arranged on the cover plate, and a minimum distance between the liquid injection hole and the protective patch is not less than 5 mm.

8. The battery according to claim 7, wherein a distance between the liquid injection hole and the protective patch is 10 mm to 25 mm.

9. The battery according to claim 1, wherein the first notch segment is perpendicular to the second notch segment, and/or a length of the first notch segment and a length of the second notch segment are consistent.

10. The battery according to claim 1, wherein an identification portion is arranged on the protective patch, the protective patch and the cover plate are connected to each other through an adhesive portion, and at least a portion of the adhesive portion is the identification portion, wherein the protective patch is a transparent member, and a color of the adhesive portion is not consistent with a color of the protective patch, such that the adhesive portion is revealed through the protective patch.

11. The battery according to claim 1, further comprising:

a shell, wherein the cover plate and the shell are connected to each other;

a cell, wherein the cell is arranged in the cover plate and the shell, and the cell comprises a cell body, a first tab, and a second tab, a first terminal component, wherein the first terminal component is arranged on the cover plate and is connected to the first tab; and a second terminal component, wherein the second terminal component is arranged on the cover plate and is connected to the second tab;

wherein the explosion-proof hole is located between the first terminal component and the second terminal component.

12. A battery apparatus, comprising the battery according to claim 1.

\*　\*　\*　\*　\*